US012592558B2

(12) United States Patent
Rivin et al.

(10) Patent No.: US 12,592,558 B2
(45) Date of Patent: Mar. 31, 2026

(54) ELECTRICAL PANELBOARD WITH INTEGRATED ARC FAULT PROTECTION

(71) Applicant: Span.IO, Inc., San Francisco, CA (US)

(72) Inventors: Aleksandar Daniel Oleg Rivin, Boulder, CO (US); Ian Casimir Dimen, Berkeley, CA (US)

(73) Assignee: Span.IO, Inc., San Francisco, CA (US)

( * ) Notice: Subject to any disclaimer, the term of this patent is extended or adjusted under 35 U.S.C. 154(b) by 168 days.

(21) Appl. No.: 18/137,272

(22) Filed: Apr. 20, 2023

(65) Prior Publication Data

US 2024/0356330 A1     Oct. 24, 2024

(51) Int. Cl.
| | |
|---|---|
| *H02H 7/22* | (2006.01) |
| *H02B 1/20* | (2006.01) |
| *H02B 1/24* | (2006.01) |

(52) U.S. Cl.
CPC ................. *H02H 7/22* (2013.01); *H02B 1/20* (2013.01); *H02B 1/24* (2013.01)

(58) Field of Classification Search
CPC ............... H02H 7/22; H02H 7/26; H02B 1/20
See application file for complete search history.

(56) References Cited

U.S. PATENT DOCUMENTS

| | | | | |
|---|---|---|---|---|
| 4,002,388 | A | * | 1/1977 | Menocal ................... H02B 1/21 |
| | | | | 439/884 |
| 5,572,438 | A | | 11/1996 | Ehlers et al. |

| | | | |
|---|---|---|---|
| 6,018,203 | A | 1/2000 | David et al. |
| 7,016,174 | B2 | 3/2006 | Dougherty |
| 7,907,388 | B2 | 3/2011 | DeBoer et al. |
| 8,488,302 | B2 | 7/2013 | Mills et al. |
| 8,937,822 | B2 | 1/2015 | Dent |
| 9,190,836 | B2 | 11/2015 | Dent |
| 9,614,588 | B2 | 4/2017 | Dent |
| 9,634,552 | B2 | 4/2017 | Dent |
| 9,659,721 | B1 | 5/2017 | Sastry et al. |
| 9,735,703 | B2 | 8/2017 | Dent |

(Continued)

FOREIGN PATENT DOCUMENTS

| | | |
|---|---|---|
| CA | 2637087 A1 | 1/2009 |
| CN | 1183860 | 6/1998 |

(Continued)

*Primary Examiner* — Thienvu V Tran
*Assistant Examiner* — Christopher J Clark
(74) *Attorney, Agent, or Firm* — Fenwick & West LLP

(57) ABSTRACT

Aspects of this disclosure concern the integration of AFCI protection into the electrical panel itself. An electrical panelboard includes a main terminal that receives a supply of electricity, multiple terminals to supply electricity to branch circuits, and a bus structure that distributes the electricity from the main terminal to the branch circuit terminals. The branch circuit terminals may be conductive stabs, to which traditional overcurrent circuit breakers are attached. The AFCI protection is integrated, either fully or partially, onto the panelboard, rather than implemented as separate standalone devices. The integrated AFCI protection includes current sensors, switching devices and a processing system. The current sensors sense the flow of electricity through the branch circuits and the switching devices can interrupt this flow of electricity. The processing system analyzes the detected currents for arc faults and controls the switching devices accordingly.

19 Claims, 8 Drawing Sheets

(56) References Cited

U.S. PATENT DOCUMENTS

| | | | |
|---|---|---|---|
| 9,785,213 B2 | 10/2017 | Dent et al. | |
| 9,831,664 B1 | 11/2017 | Sastry et al. | |
| 9,960,637 B2 | 5/2018 | Sanders et al. | |
| 9,966,206 B1 | 5/2018 | Sastry et al. | |
| 10,090,777 B2 | 10/2018 | Dent | |
| 10,135,361 B2 | 11/2018 | Dent | |
| 10,148,093 B2 | 12/2018 | Dent | |
| 10,205,324 B2 | 2/2019 | Dent | |
| 10,312,684 B2 | 6/2019 | Niaki et al. | |
| 10,536,039 B2 | 1/2020 | Haartsen | |
| 10,564,193 B2 | 2/2020 | Kania et al. | |
| 10,663,443 B2 | 5/2020 | Kates | |
| 10,666,161 B2 | 5/2020 | Dent | |
| 10,784,710 B2 | 9/2020 | Dent | |
| 10,840,735 B1 | 11/2020 | Cooper | |
| 10,998,755 B2 | 5/2021 | Dent | |
| 11,050,260 B2 | 6/2021 | Narla et al. | |
| 11,196,272 B2 | 12/2021 | Dent | |
| 11,342,754 B2 | 5/2022 | Rao et al. | |
| 11,552,500 B2 | 1/2023 | Rao et al. | |
| 11,642,977 B2 | 5/2023 | Bhargava et al. | |
| 11,888,306 B1 * | 1/2024 | Arool Emmanuel . | G01J 5/0096 |
| 12,062,901 B2 | 8/2024 | Rao | |
| 2005/0068820 A1 | 3/2005 | Radosevich et al. | |
| 2005/0099314 A1 | 5/2005 | Aisa | |
| 2005/0116814 A1 | 6/2005 | Rodgers et al. | |
| 2007/0064377 A1 | 3/2007 | Deboer et al. | |
| 2007/0158171 A1 | 7/2007 | Deboer et al. | |
| 2007/0247134 A1 | 10/2007 | Ryan et al. | |
| 2008/0041704 A1 | 2/2008 | Mccoy | |
| 2009/0018706 A1 | 1/2009 | Wittner | |
| 2009/0021879 A1 | 1/2009 | Rivers et al. | |
| 2010/0017045 A1 | 1/2010 | Nesler et al. | |
| 2010/0163377 A1 | 7/2010 | Frassineti et al. | |
| 2010/0289451 A1 | 11/2010 | Tuffner et al. | |
| 2010/0301809 A1 | 12/2010 | Bhade et al. | |
| 2011/0037429 A1 | 2/2011 | Deboer et al. | |
| 2011/0172841 A1 | 7/2011 | Forbes | |
| 2012/0127088 A1 | 5/2012 | Pance et al. | |
| 2012/0212872 A1 | 8/2012 | Padmanabh et al. | |
| 2012/0217954 A1 | 8/2012 | Cook | |
| 2012/0286729 A1 | 11/2012 | Yegin et al. | |
| 2012/0330473 A1 | 12/2012 | Meredith et al. | |
| 2013/0030590 A1 | 1/2013 | Prosser | |
| 2013/0057214 A1 | 3/2013 | Stevens | |
| 2013/0120453 A1 | 5/2013 | Carmi | |
| 2013/0249298 A1 | 9/2013 | Dong et al. | |
| 2014/0063695 A1 | 3/2014 | Martin et al. | |
| 2014/0088780 A1 | 3/2014 | Chen | |
| 2014/0167787 A1 | 6/2014 | Sanchez et al. | |
| 2014/0175881 A1 | 6/2014 | Creed | |
| 2015/0035485 A1 | 2/2015 | Wu et al. | |
| 2015/0162157 A1 | 6/2015 | Luebke et al. | |
| 2015/0260761 A1 | 9/2015 | Brick et al. | |
| 2015/0270695 A1 | 9/2015 | Baker et al. | |
| 2015/0316944 A1 | 11/2015 | Thellend | |
| 2016/0009354 A1 | 1/2016 | Lai et al. | |
| 2016/0137087 A1 | 5/2016 | Haas et al. | |
| 2016/0178678 A1 | 6/2016 | Pelletier et al. | |
| 2016/0226251 A1 | 8/2016 | Tenca et al. | |
| 2016/0241017 A1 | 8/2016 | Schroeder et al. | |
| 2016/0305797 A1 | 10/2016 | Pietrasik et al. | |
| 2017/0141610 A1 | 5/2017 | Niaki et al. | |
| 2017/0264817 A1 | 9/2017 | Yan et al. | |
| 2017/0288384 A1 | 10/2017 | Loewenstern et al. | |
| 2017/0302039 A1 | 10/2017 | Tremaine et al. | |
| 2018/0048142 A1 | 2/2018 | Immel et al. | |
| 2018/0048159 A1 | 2/2018 | Narla et al. | |
| 2018/0205206 A1 | 7/2018 | Bazhinov | |
| 2018/0254633 A1 | 9/2018 | Covic et al. | |
| 2018/0284169 A1 * | 10/2018 | Kwan | H02J 13/00002 |
| 2018/0358839 A1 | 12/2018 | Perez et al. | |
| 2019/0181690 A1 | 6/2019 | Haartsen et al. | |
| 2019/0190266 A1 | 6/2019 | Soulieres et al. | |
| 2019/0291594 A1 | 9/2019 | Lu et al. | |
| 2019/0389315 A1 | 12/2019 | Zhu | |
| 2020/0014206 A1 | 1/2020 | Haartsen et al. | |
| 2020/0023747 A1 | 1/2020 | Logvinov et al. | |
| 2020/0073342 A1 | 3/2020 | Lee et al. | |
| 2020/0112199 A1 | 4/2020 | Rao | |
| 2020/0259336 A1 | 8/2020 | Rao et al. | |
| 2020/0403394 A1 * | 12/2020 | Yoon | H02H 1/0015 |
| 2021/0083506 A1 | 3/2021 | Rao et al. | |
| 2021/0362614 A1 | 11/2021 | Carr | |
| 2022/0139191 A1 | 5/2022 | Price et al. | |
| 2022/0140644 A1 | 5/2022 | Dent | |
| 2022/0216697 A1 | 7/2022 | Rao et al. | |
| 2022/0216728 A1 | 7/2022 | Ashman et al. | |
| 2022/0247175 A1 * | 8/2022 | Ganger | H02J 3/388 |
| 2023/0120453 A1 | 4/2023 | Rao et al. | |
| 2023/0120740 A1 | 4/2023 | Lewchuk et al. | |
| 2023/0155482 A1 | 5/2023 | Dent | |
| 2023/0179015 A1 | 6/2023 | Rao et al. | |
| 2023/0396069 A1 | 12/2023 | Rao et al. | |
| 2024/0356312 A1 * | 10/2024 | Rivin | H02H 1/0015 |
| 2025/0038517 A1 | 1/2025 | Rao | |
| 2025/0266711 A1 | 8/2025 | Ashman et al. | |

FOREIGN PATENT DOCUMENTS

| | | | |
|---|---|---|---|
| CN | 201623478 | 11/2010 | |
| CN | 101951014 | 1/2011 | |
| CN | 102470775 | 12/2014 | |
| CN | 105846403 A | 8/2016 | |
| CN | 106159990 | 11/2016 | |
| CN | 103828167 | 1/2018 | |
| CN | 206976837 | 2/2018 | |
| CN | 106325240 | 10/2018 | |
| CN | 105305406 | 8/2019 | |
| CN | 107800376 | 8/2021 | |
| EP | 2711233 B1 | 11/2024 | |
| WO | WO-2011/019509 A1 | 2/2011 | |
| WO | WO-2013/144947 A2 | 10/2013 | |
| WO | WO-2014/175897 A2 | 10/2014 | |
| WO | WO-2018/111977 A1 | 6/2018 | |

* cited by examiner

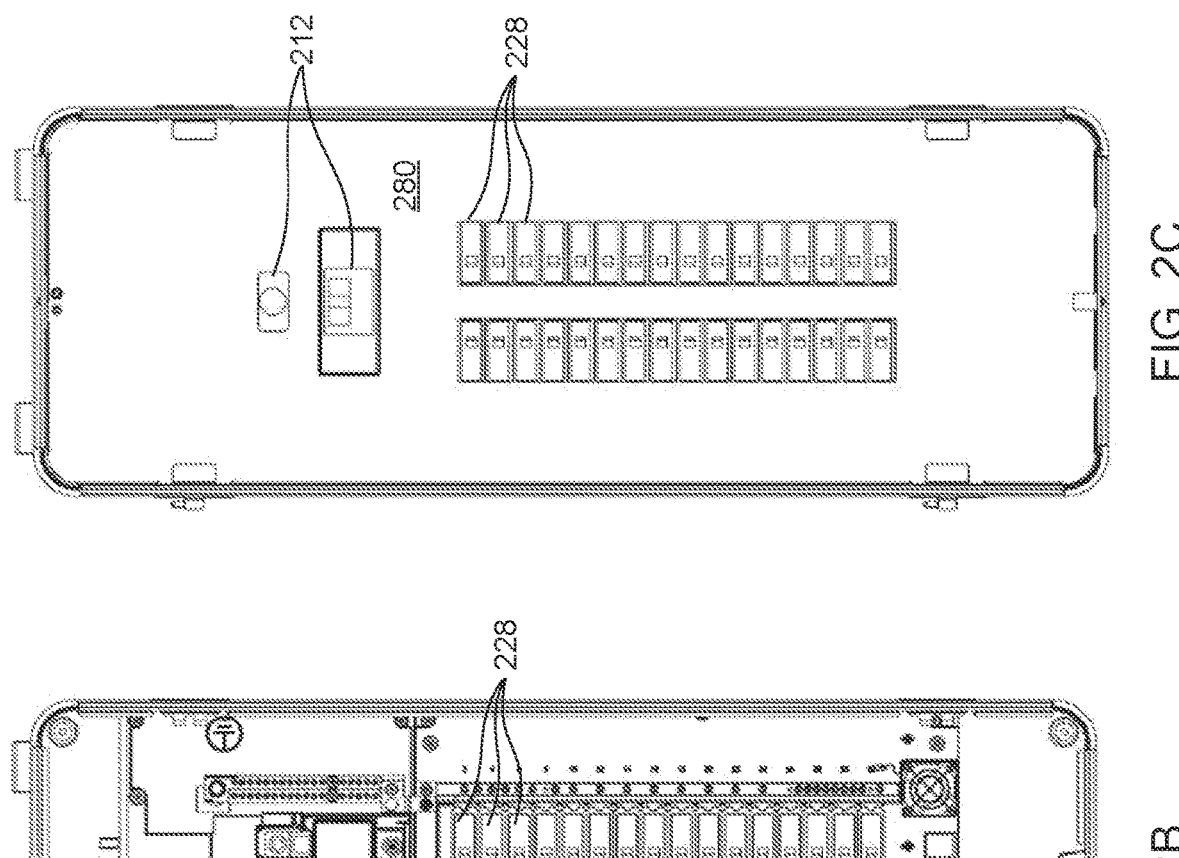
FIG. 2C
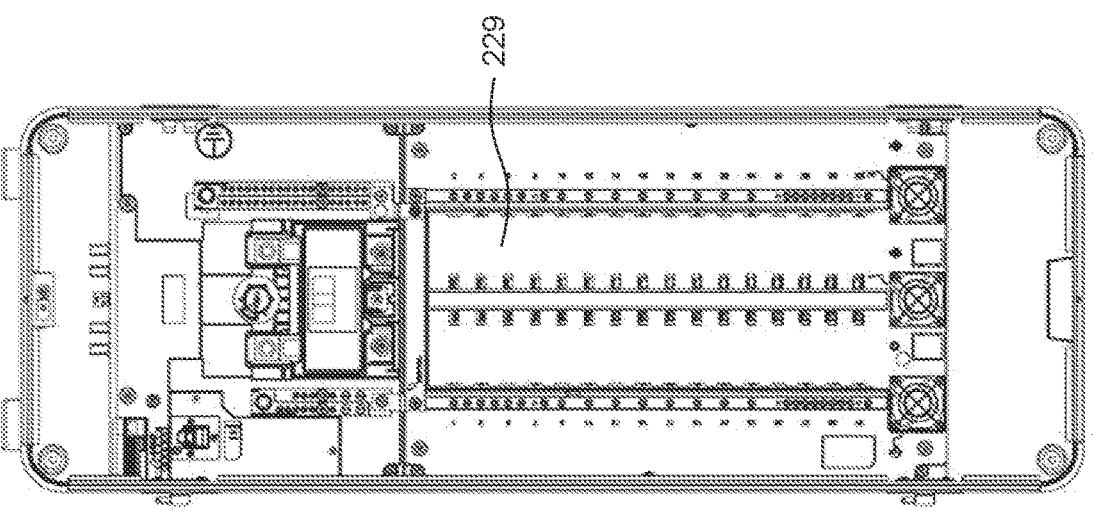
FIG. 2B
FIG. 2A

ELECTRICAL PANELBOARD WITH INTEGRATED ARC FAULT PROTECTION

BACKGROUND

1. Technical Field

This disclosure relates generally to arc fault protection and, more particularly, to arc fault protection integrated onto electrical panelboards.

2. Description of Related Art

An arc fault occurs when a problem in an electrical system results in arcing. Arc faults may be caused by various electrical problems: damaged, overheated or exposed wiring; stressed, loose or improper devices and connections; pierced insulation or conductors from nails, screws or other sharp objects; deterioration caused by heat, age, stress or abrasion; defective or compromised outlets and circuits; and damaged or unsuitable loads and electrical cords. If left undetected, arc faults can cause further damage to the electrical system, electrical shocks and fires.

As a result, arc fault circuit interruption (AFCI) protection is now required by many building standards. AFCI protection typically comes in the form of a self-contained device that protects an individual branch circuit, such as a residential home miniature breaker. In a common scenario, an electrical panel may be installed first but without any AFCI protection. Individual AFCI breakers are then added to the electrical system to provide protection for specific branch circuits.

BRIEF DESCRIPTION OF THE DRAWINGS

Embodiments of the disclosure have other advantages and features which will be more readily apparent from the following detailed description and the appended claims, when taken in conjunction with the examples in the accompanying drawings, in which:

FIG. 2A is an end user's view of one implementation of the electrical panel of FIG. 1.

FIG. 2B is a view of the electrical panel of FIG. 2A with the dead front panel removed.

FIG. 2C is a view of the electrical panel of FIG. 2B with the overcurrent circuit breakers removed.

DETAILED DESCRIPTION OF THE PREFERRED EMBODIMENTS

Figure 1:
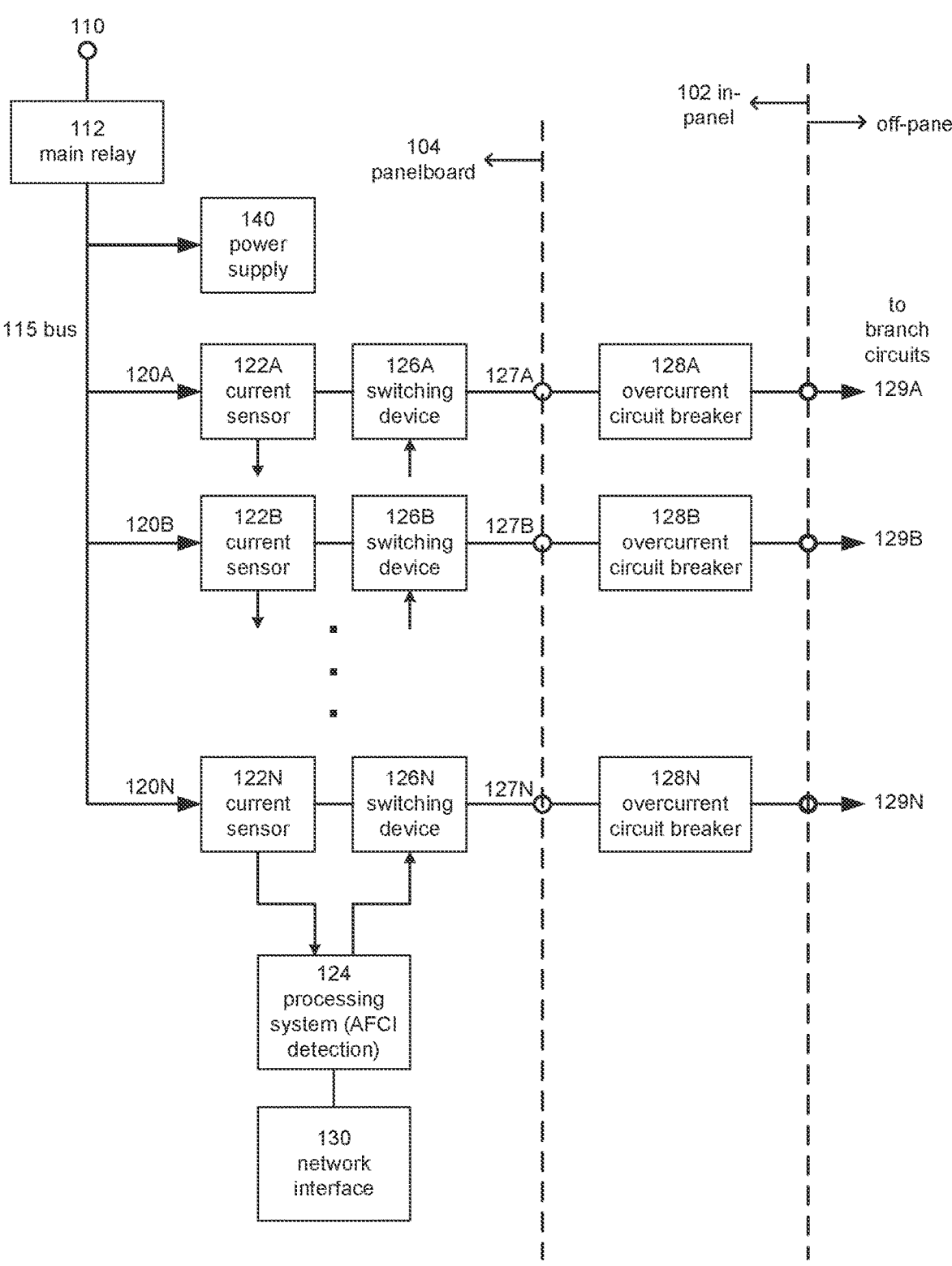
FIG. 1 is a block diagram of an electrical panel with integrated AFCI protection.

The figures and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Aspects of this disclosure relate to electrical panelboards with integrated arc fault protection. Arc faults can be caused by many different types of problems in the electrical system, which can cause different types of arc faults. For example, arc faults can broadly be classified as parallel arc faults and series arc faults. Parallel arcs occur between two different conductors: hot and neutral, hot and ground, or neutral and ground, for example. Parallel arcs can be caused by shorting between the conductors. Series arcs occur along the same conductor or conductive path. For example, a severed conductor can result in a series arc.

Traditional AFCI breakers are typically self-contained devices that are installed to provide protection for individual branch circuits. However, this approach has many drawbacks. For example, since each AFCI breaker is self-contained, all of the processing and electronics for AFCI protection is replicated in each AFCI breaker, which increases the cost. Moreover, traditional AFCI breakers that are self-contained do not use algorithms or firmware that can be updated or tuned remotely, which results in a less robust and accurate system. In addition, electrical installers typically must stock both traditional circuit breakers, which protect against overcurrent, and AFCI breakers. This results in additional cost and overhead for the installer.

Finally, there are different types of arc faults and they can be caused by different types of electrical problems. As a result, it can be more difficult to correctly detect arc faults. Self-contained AFCI breakers often have less computing power due to cost constraints and therefore have limited accuracy in detecting arc faults. They may detect an arc fault when no arc fault actually exists. These false positives, also known as nuisance trips, are a nuisance at best and at worst can undermine the end user's confidence in the breaker or electrical installation, requiring rework of the installation.

Accordingly, aspects of this disclosure concern the integration of AFCI protection into the electrical panel itself. In one example, an electrical panelboard includes a main terminal that receives a supply of electricity, multiple terminals to supply electricity to branch circuits, and a bus structure that distributes the electricity from the main terminal to the branch circuit terminals. The branch circuit terminals may be conductive stabs, to which traditional overcurrent protection devices, such as residential miniature circuit breakers, are attached. They may also be fuse holders, in panels that use fuses instead of circuit breakers.

In some cases, the AFCI protection may be fully integrated onto the panelboard, rather than implemented as separate stand-alone devices. The integrated AFCI protection includes current sensors, switching devices and a processing system. The current sensors sense the flow of electricity through the branch circuits and the switching devices can interrupt this flow of electricity. The processing system analyzes the detected currents for arc faults and controls the switching devices accordingly. The current sensors and switching devices are coupled to conductive paths between the bus structure and the branch circuit terminals. They are positioned on the line-side (upstream) of the branch circuit terminals, rather than implemented as separate breakers that connect to the branch-side (downstream) of the branch circuit terminals.

In other cases, the AFCI protection may be only partially integrated onto the panelboard. For example, some of the current sensors may be located to the branch-side of the electrical panelboard. They may be coupled to downstream sections of the branch circuits or may be built into devices that are plugged into outlets. Similarly, the switching devices may also be located to the branch-side of the electrical panelboard. Some or all of the processing may also take place outside the electrical panel.

This integrated approach has many advantages. Integrating components onto the panelboard allows components to be shared across multiple branch circuits. For example, a single more powerful processor may be used to analyze signals for multiple branch circuits. In addition, the processor may consider data from multiple branch circuits (or even from other panels) to detect arc faults on a specific branch circuit. The processor may also make use of other types of data, such as historical data or information about the electrical characteristics of devices connected to the branch circuit. As another example, a single power supply may be used to power all of the AFCI protection components integrated on the panelboard. In addition, components may also be shared across multiple functions. For example, common components may be used for AFCI protection, energy metering, energy management and other functions implemented on the panel. Sharing components reduces cost.

Another advantage is that AFCI protection may be configured and updated more easily, especially if remote access is provided. An electrical installer may choose to activate AFCI protection where and when needed by individually enabling or disabling the protection function on a per-branch-circuit basis. With remote networked access, the AFCI protection may be reconfigured, updated and monitored without requiring an on-site visit. Specialized apps may also be used. The integrated AFCI protection may also be more convenient to test and inspect than traditional AFCI systems. The integrated approach also allows for the implementation of more advanced and more customized arc fault detection algorithms, which can reduce the number of nuisance trips.

In more detail, FIG. 1 is a block diagram of an electrical panel with integrated AFCI protection. The overall electrical system may be divided into the following regions, as shown in FIG. 1. The electrical panel 102 includes the panel housing and everything inside the housing. Components that are inside the panel housing will be referred to as in-panel components. In-panel components include both components that are part of the panelboard 104 and additional components that an installer might add inside the panel during installation or service, such as traditional overcurrent circuit breakers. The panelboard 104 refers to the structure or backplate that contains the electrical components that are part of the panel. These components may be referred to as native, integrated or on-panelboard components. Components outside the panel are referred to as off-panel components.

The panelboard 104 shown in FIG. 1 includes a main terminal 110 and many branch circuit terminals 127A-N. The main terminal 110 receives a supply of electricity, although electricity may be received through other terminals in some designs and there may even be no main terminal. Main relay 112 allows for interruption of that supply. A bus structure 115 distributes the electricity from the main terminal 110 to the branch circuit terminals 127A. The bus structure 115 may use conductive bus bars.

Each branch 120A-N from the main bus structure 115 to the branch circuit terminals 127A-N includes native AFCI circuitry, which includes a current sensor 122 and switching device 126 in this example. The current sensors 122 are coupled to the conductors that branch off the bus 115 and they sense the current flowing through the branches 120. Examples of current sensors include current transformers, Hall effect sensors, current sensors based on magnetoresistive elements, inductive pickup coils, shunt resistors, and fluxgate current sensors. Depending on the design, the current sensor 122 may be connected in series along the branch 120, or it may be coupled in some other way to the branch (e.g., inductive coupling). It may be an impedance in series with the current flow, for example by sensing across a simple wire with no added resistance. Other types of sensors, for example voltage sensors, may also be used. The switching devices 126 are electrically connected along the branch conductors 120 and can be switched to interrupt the flow of electricity in the branch circuits 129. Examples of switching devices include semiconductor switches, relays, motor-driven switches, and shunt trip circuit breakers or other electrically triggered spring-driven contact systems. The switching and sensing may be done by low voltage circuitry in the panel.

The panelboard 104 in this example also includes a native processing system 124, which may include analog-to-digital converters, microcontrollers and output drivers. The processing system 124 is shared by multiple branches 120, which reduces the cost compared to an architecture where a separate processing system is provided for each branch. For example, a single processing chip may be used for all of the branches in the panel. Alternatively, the processing system may include multiple processing chips, and each chip is used for a subset of the branches in the panel. The processing system 124 analyzes the current signals from the current sensors 122, detects arc fault events based on the analysis, and controls the switching devices 126 to interrupt the flow of electricity to the branch circuits in response to detecting arc fault events. The processing system 124 may include digital integrated circuits, FPGAs, ASICS, DSPs, mixed signal integrated circuits, processors and/or controllers. In some cases, the processing system 124 may be software programmable and the overall AFCI protection may be software configurable.

The panelboard 104 also includes a network interface or gateway 130 to provide connectivity to compute resources outside the panel. The interface 130 may be wireless and/or wired. It may be for local connection, such as Bluetooth or connection to handheld diagnostic tools, or for broader network connection, such as to the Internet or a local area network. The network interface 130 may be used to allow the processing system 124 to access compute resources and data from outside the panel. It also allows the processing system 124 to provide data and status reports/alarms to other devices, such as a phone-based app or a central control center for a residence. In some cases, the AFCI functionality of the processing system 124 may be modified, updated and/or configured remotely via the network interface 130.

The panelboard 104 also includes an integrated power supply 140 to power the on-panelboard components, such as the switching devices 126, processing system 124, network interface 130 and possibly the current sensors 124 (if they require power). The power supply 140 draws power from the electricity supplied through the main terminal 110 and conditions it for the on-panelboard components. It may draw directly from the main terminal 110, from bus 115, or from stabs, for example. For clarity, the power feeds from the supply 140 to the different components are not shown in the figures.

In this example, the branch circuit terminals 127 are conductive stabs, to which overcurrent circuit breakers 128 may be attached. These circuit breakers 128 may be installed and removed in the field by a trained installer. The installer also connects the circuit breakers 128 to the branch circuits 129, which distribute the electricity to appliances and other loads throughout the premises.

FIGS. 2A-2C show front view of one physical implementation of the panel of FIG. 1. FIG. 2A is an end user's view of the panel. In the end user view, most of the electrical components are not physically accessible, except for the following. Traditional overcurrent circuit breakers 228 may be set and reset by the end user, as can the main relay and breaker 212. The AFCI components may also have some user-accessible features, such as test and reset (not shown in FIG. 2). The rest of the electrical components in the panel are hidden under a dead front panel 280. Access may also be possible through the network interface. For example, an app may provide a user interface to the electrical components that are not physically accessible.

FIG. 2B is a view of the electrical panel of FIG. 2A with the dead front panel removed. The circuit breakers 228 are still installed. FIG. 2C is a view of the electrical panel of FIG. 2B with the overcurrent circuit breakers removed. The on-panel components shown in FIG. 1 may be implemented in various locations in FIGS. 2B and 2C. The current sensors 122 and switching devices 126 may be implemented underneath the panel 229 for the circuit breakers 228. The power supply 140, processing system 124 and network interface 130 may be implemented on the panelboard away from the main electrical distribution area.

FIGS. 1 and 2 show one example of an electrical panel. Other variations will be apparent. For example, electrical panels may also receive and provide DC power. There may also be power distribution between the AC and DC parts of the electrical panel. Examples of other electrical panels in which AFCI protection may be implemented are described in U.S. Pat. No. 11,342,754 FIGS. 5-16 and the associated text, which are incorporated by reference in their entirety. AFCI protection generally includes the following functions: monitoring (by current sensor 122 and/or other sensors), analysis/detection (by processing system 124) and interruption (by switching device 126 or other actuators). However, not all of these have to be on the panelboard.

Figures 3A, 3B:
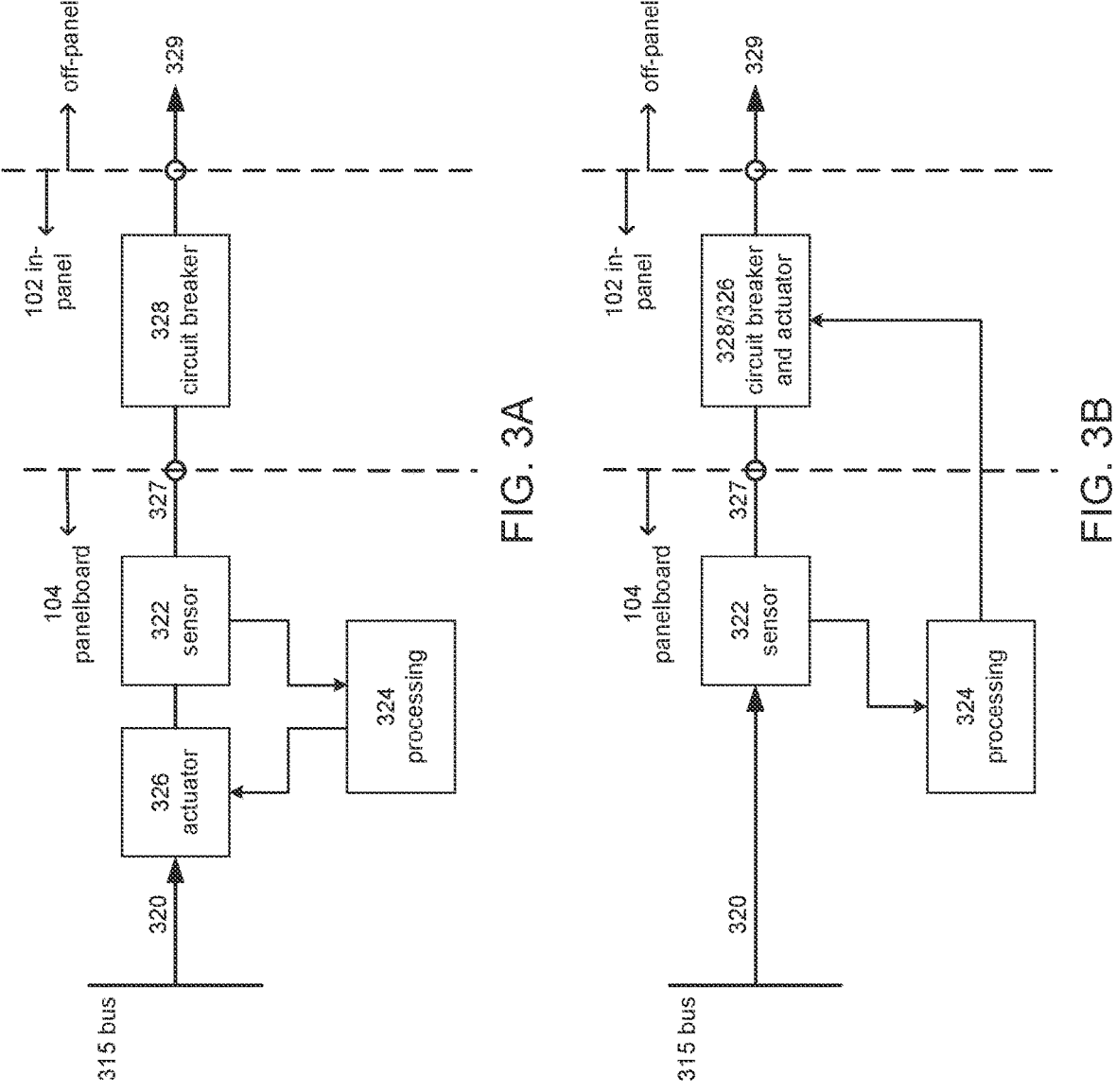
FIGS. 3A-3C are block diagrams of a branch showing different locations for the sensor.
Figure 3C:
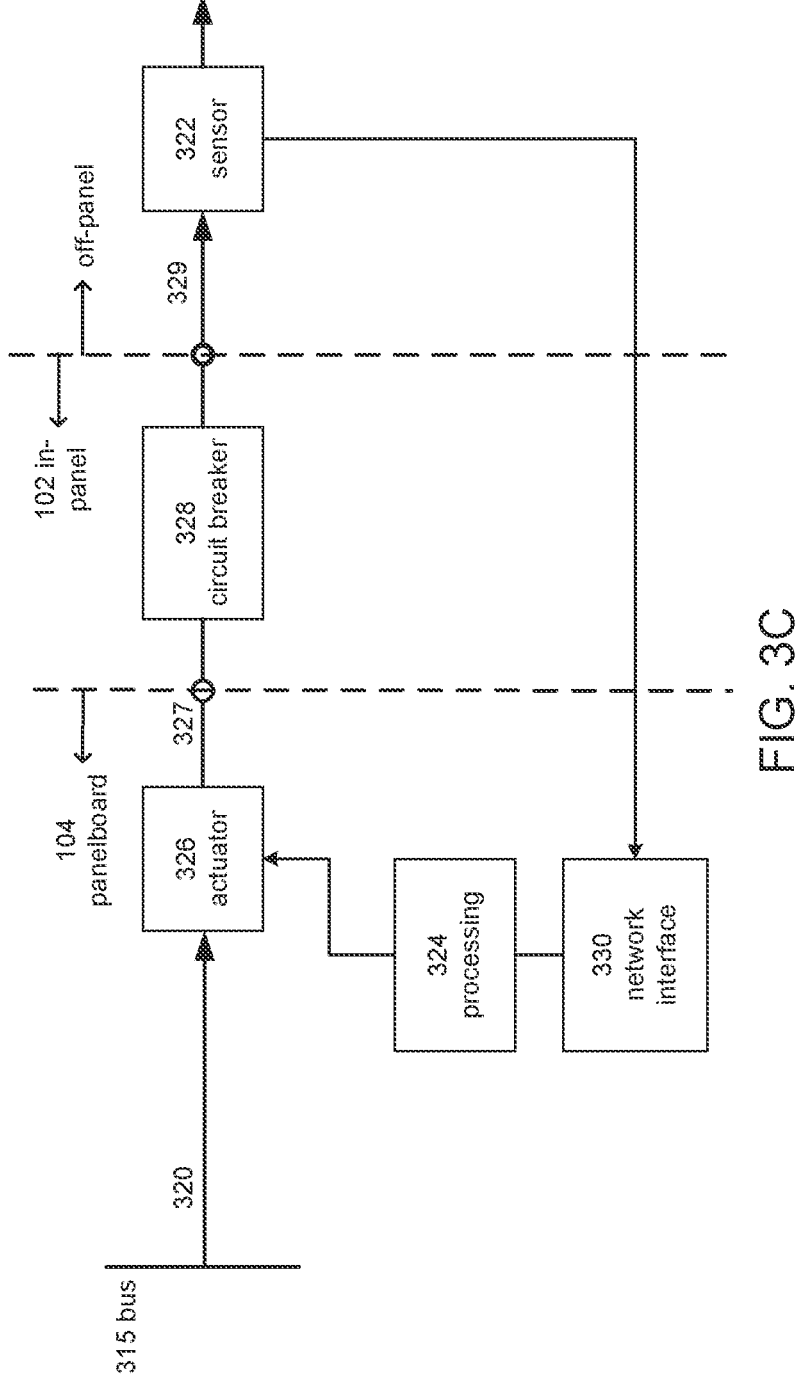

FIGS. 3A-3C show some examples of alternate locations for the sensor 322 and actuator 326. These figures show one branch 320 from bus 315. In FIG. 3A, the order of the sensor 322 and actuator 326 are reversed, but both are still on the panelboard.

In FIG. 3B, the actuator 326 may be part of a circuit breaker that is installed in the panel but is not native to the panelboard. For example, the actuator 326 may be integrated with an overcurrent circuit breaker 328. The processing system 324 may control the actuator 326 via in-panel communications, for example if the devices 328/326 and 324 have a standard signalling interface.

In FIG. 3C, the sensor 322 is outside the panel. It may be located anywhere along the branch circuit 329. It may be integrated into devices that are plugged into outlets or may be integrated into outlets. Current sensing may also be added to monitor electricity flow through branch circuit conductors. In this example, the current signals are communicated to the processing system 324 via the network interface 330.

FIGS. 3A-3C show some examples. The sensor 322 and/or actuator 326 may also be located at other positions, including both in-panel and off-panel. For example, many devices already have integrated actuators. Overcurrent circuit breakers, certain types of outlets, and many appliances include actuators. These actuators may be used to provide AFCI protection if the processing system 324 can access and control the actuator via some interface.

In most embodiments, the panelboard will include at least one of the sensor 322 and the actuator 326 (but not necessarily both). It often will also contain processing capability for the most basic, required AFCI protection.

Figure 4:
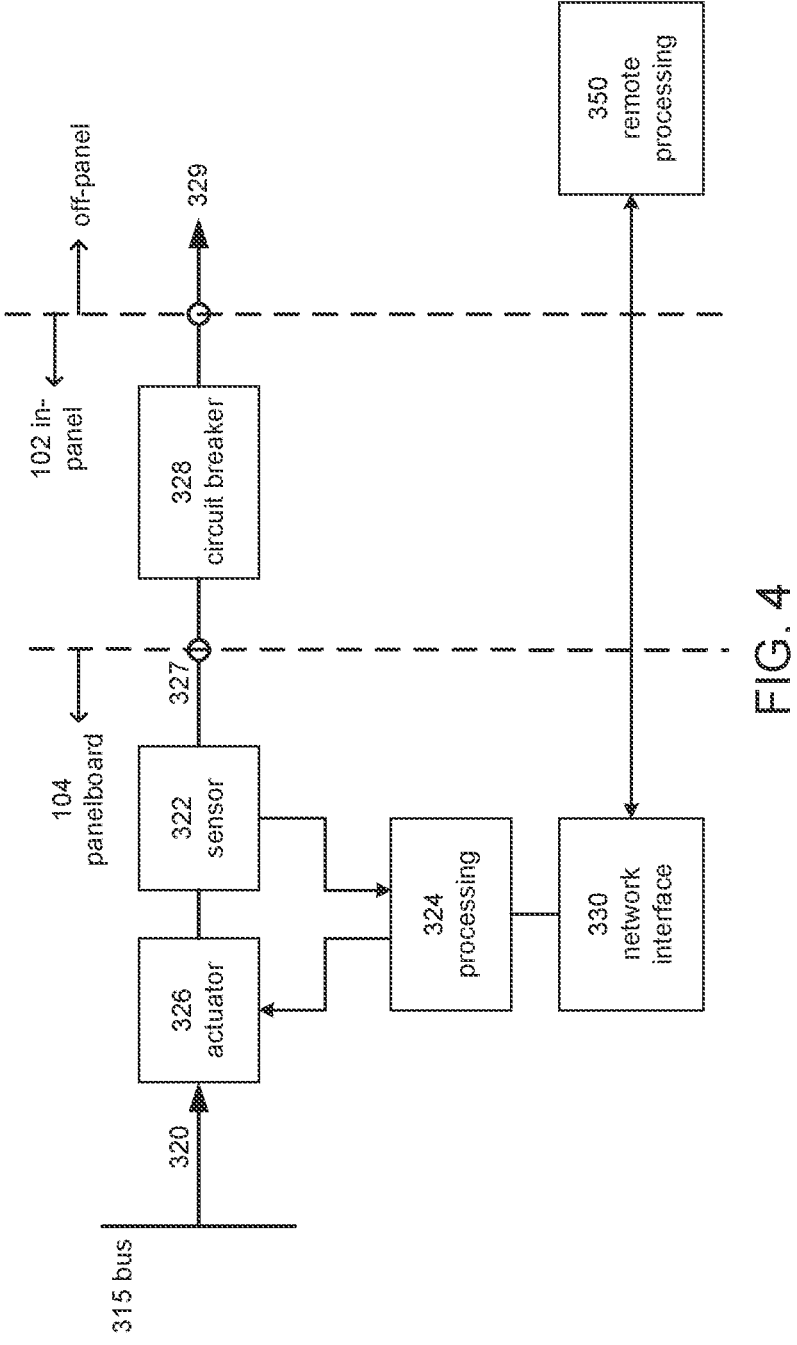
FIG. 4 is a block diagram showing AFCI processing split between in-panel and off-panel.

Finally, the processing capability may also be located at or split between different locations. FIG. 4 is a block diagram showing AFCI processing split between in-panel processing 324 and off-panel processing 350. Some processing 324 is better implemented as native to the panelboard. For example, safety standards may require certain functions to be contained entirely within the electrical panel. In addition, it may be advantageous to implement certain functions within the electrical panel even if not required to do so, for example if fast response time is required, if the processing is local to the panel, or if availability is required even when there is no network connection. When safety is involved, it is not unusual to require that some basic safety function is always available and operating under all circumstances. Those functions are usually better implemented on the panelboard.

Remote processing 350 may be appropriate for functions where real-time operation or low latency are not required, where the processing is not just local to the panel, where significant compute resources are required, or where the additional functionality is optional or augments a more basic function that is in-panel.

Figure 5A:
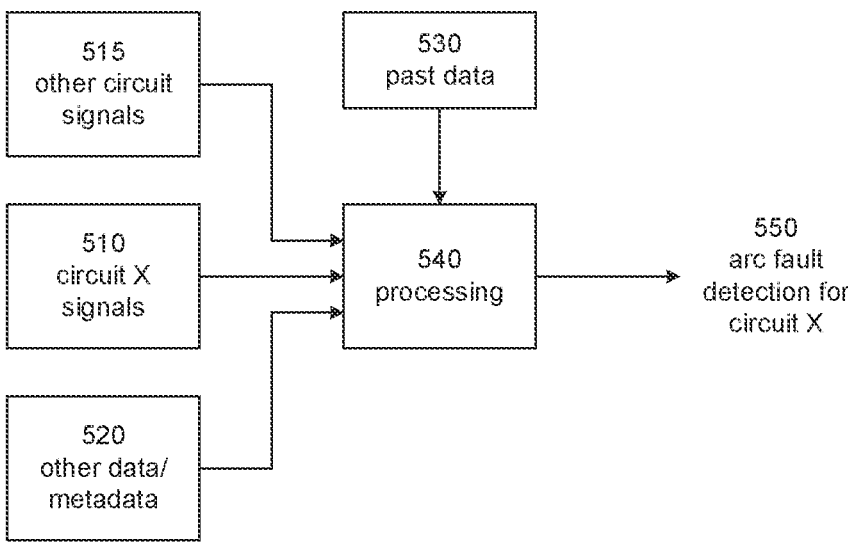
FIGS. 5A and 5B are diagrams showing possible data sources that may be used for arc fault detection.
Figure 5B:
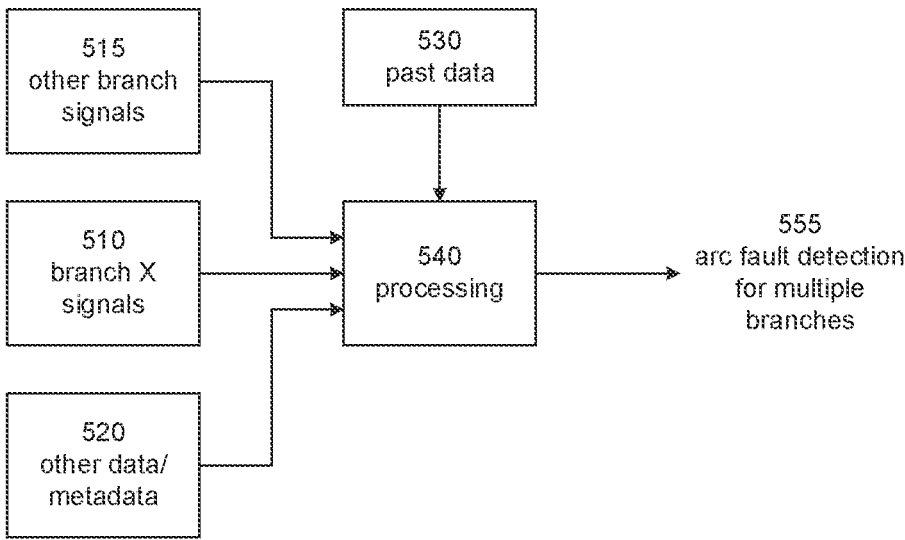

FIGS. 5A and 5B are diagrams showing possible data sources that may be used for arc fault detection. FIG. 5A shows possible data sources used for arc fault detection on branch circuit X. The data sources may include real-time measurements 510 of branch circuit X, real-time measurements 515 of other branch circuits, other types of data/metadata 520, and past data 530. The past data 530 may be used directly, or it may be used to adapt the processing 540 used to detect arc faults. In FIG. 5A, some or all of this data is used to detect arc faults 550 for branch circuit X alone. In FIG. 5B, the arc fault detection 555 for multiple branches are considered together. For example, a likelihood of arc fault may be calculated for each branch and then the branch with the highest likelihood is identified as the one with the arc fault.

In more detail, basic arc fault detection capabilities may be required to detect a limited set of lab-generated arc fault scenarios, with a small set of acceptance criteria. The approaches for basic arc fault detection for a branch circuit may be based on a frequency domain analysis of the current signals for that branch circuit and/or a time domain analysis of the current signals. This basic functionality is likely implemented on the panelboard, particularly if required by safety standards.

However, having a more powerful native processor allows for more sophisticated processing. Different types of arc faults may have different characteristics. Arc faults may broadly be classified as parallel arc faults and series arc faults. Parallel arc faults may manifest as large, uncontrolled currents which pass through a fault path. In some approaches, parallel arc faults may be detected by counting the number of times that current exceeds a threshold within a given time period. Parallel arc faults may also be detected by looking for the current to cease for some fraction of the AC line cycle, which may indicate the extinction and re-ignition of the arc as current flow ceases during the AC line cycle reversal and then is re-established.

Series arc faults may manifest as irregular, rapidly varying voltage drops which act to reduce load current. These faults may produce signal variation across a broad range of frequencies due to the stochastic nature of arc conduction, and so may be detected by monitoring the amplitude of the current signal in one or more high frequency bands, such as bands starting at no less than 20-30 kHz and in some cases extending up to 20 MHz or more. Detection may also be based on correlating these high frequency signals with the phase of the AC line cycle.

Different detection techniques for different arc faults may be loaded onto the processing system and applied as appropriate to different branches. The techniques used may be updated as they are improved or enhanced.

The detection techniques may also be adapted to the specifics of the branch circuit. For example, the risk of various arc faults occurring may depend on the loading of the branch circuit. Different appliances may have different risk of arc fault or specific signatures characterizing arc faults that may occur in that appliance. The detection techniques applied to the current signals from a particular branch circuit may be tailored to the appliances loaded on that branch circuit. As another example, arc fault detection may be adapted based on past data for the branch circuit. A particular branch circuit may be subject to certain background signals, noise or crosstalk. Measurements of these may be collected over time and then used as a baseline against which arc fault detection is performed. As a final example, adaptation may be used to reduce the rate of false positives. When false positives (nuisance trips) occur and are identified as such, this information may be collected over time and the detection techniques are then adapted to better distinguish between real arc faults and false positives, or to determine whether a detected fault is actually a false positive. Of course, actual detected arc faults may also be stored, characterized and used to improve detection.

The information used to adapt the detection techniques may be based on measurements of the branch circuit and/or data that is provided otherwise. For example, the panel may automatically discover what appliances are loading which branch circuit. Alternatively, some other device may discover this information and transmit it to the panel. In yet another alternative, an installer or electrician may specify this information, for example via the user interface on an app. Analogously, baseline noise and crosstalk measurements may be performed by the panel itself, or by other devices and then provided to the panel.

The analysis for adaptation may also be performed in-panel (e.g., by the AFCI processing system) or off-panel (e.g., by Internet compute resources). Off-panel resources may provide more computing power to execute more complex analysis, particularly if the analysis is not required to be real-time. Off-panel resources may analyze large, stored records of past measurements and events, including across multiple branch circuits, across different panels, or even across different premises.

In some cases, off-panel resources may be limited to providing a veto function on in-panel fault detection, rather than providing off-panel fault detection. This way, safety is not jeopardized if the off-panel resource is not available. The in-panel resource may detect faults based on a simpler but less accurate algorithm, and the off-panel resource then performs a more elaborate, more accurate analysis of the data. If the off-panel resource determines that the detected fault is a false positive, it may override the simple in-panel algorithm. However, if the off-panel resource is not available or does not complete in time, this does not jeopardize safety.

In yet another variation, the arc fault detection techniques may consider more than one branch circuit. Rather than analyzing the signals from only one branch circuit to detect arc faults on that branch circuit, the signals from other branch circuits may also be analyzed. For example, if there is cross-talk between branch circuits, then an arc fault on one branch circuit may result in current anomalies on the other branch circuits even though there is no arc fault on those circuits. Detection of arc faults in situations such as this may be improved by considering cross-correlation of signals on different branches, or by considering which of the branches is the most likely location of the arc fault.

Figure 6:
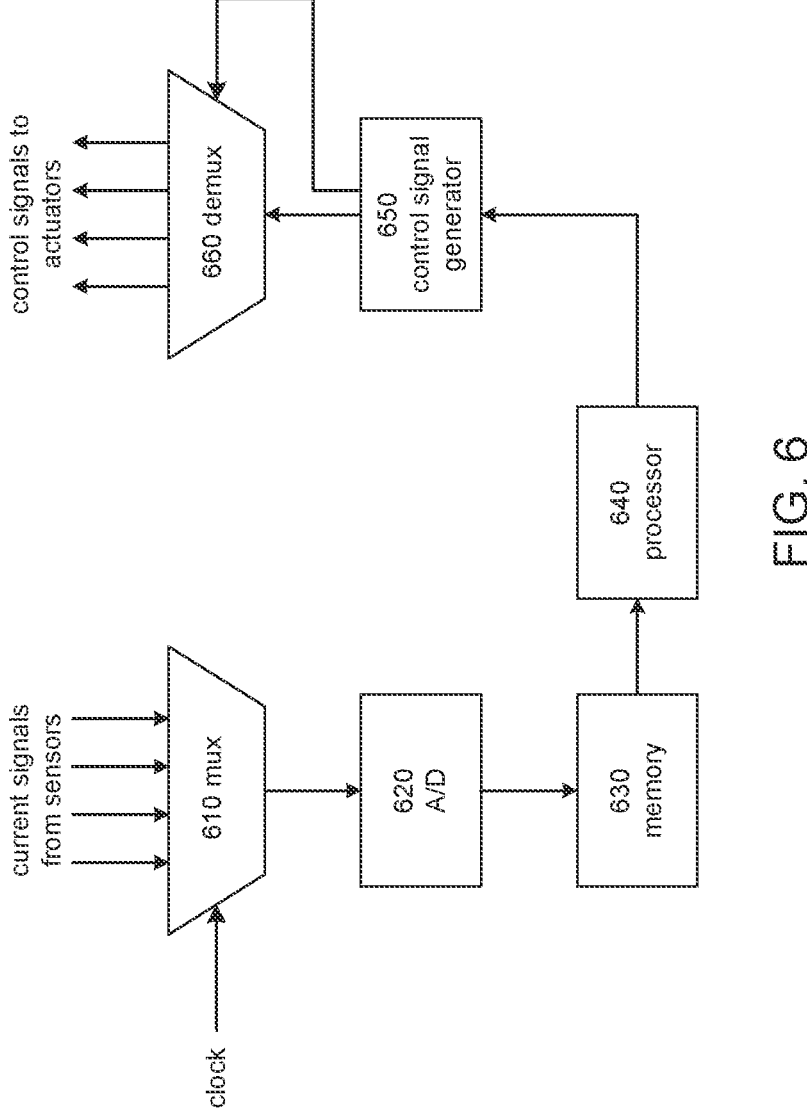
FIG. 6 is a block diagram of an AFCI processing system that services multiple branch circuits.

In other designs, the various components 122, 124, 126 for the AFCI protection of FIG. 1 may be shared in different ways between the different branch circuits. In FIG. 1, there is one current sensor 122 and one switching device 126 for each branch circuit 129, and one processing system 124 is shared by all of the branch circuits. FIG. 6 is a block diagram of such a processing system. The current signals from the sensors are multiplexed 610 to analog/mixed signal circuitry 620, which operates at a higher clock frequency than the sampling frequency of the current signals. The circuitry 620 samples each of the signals from the current sensors and saves the samples to memory 630. The circuitry 620 may also perform some conditioning or pre-processing, such as noise filtering. A microprocessor 640 analyzes the samples for possible arc faults. When an arc fault is detected, the processor instructs circuitry 650 to send a control signal to the appropriate actuator, which is selected via a demultiplexer 660. The multiplexing 610 and demultiplexing 620 functions may be provided by components other than separate multiplexers and demultiplexers.

Figure 7:
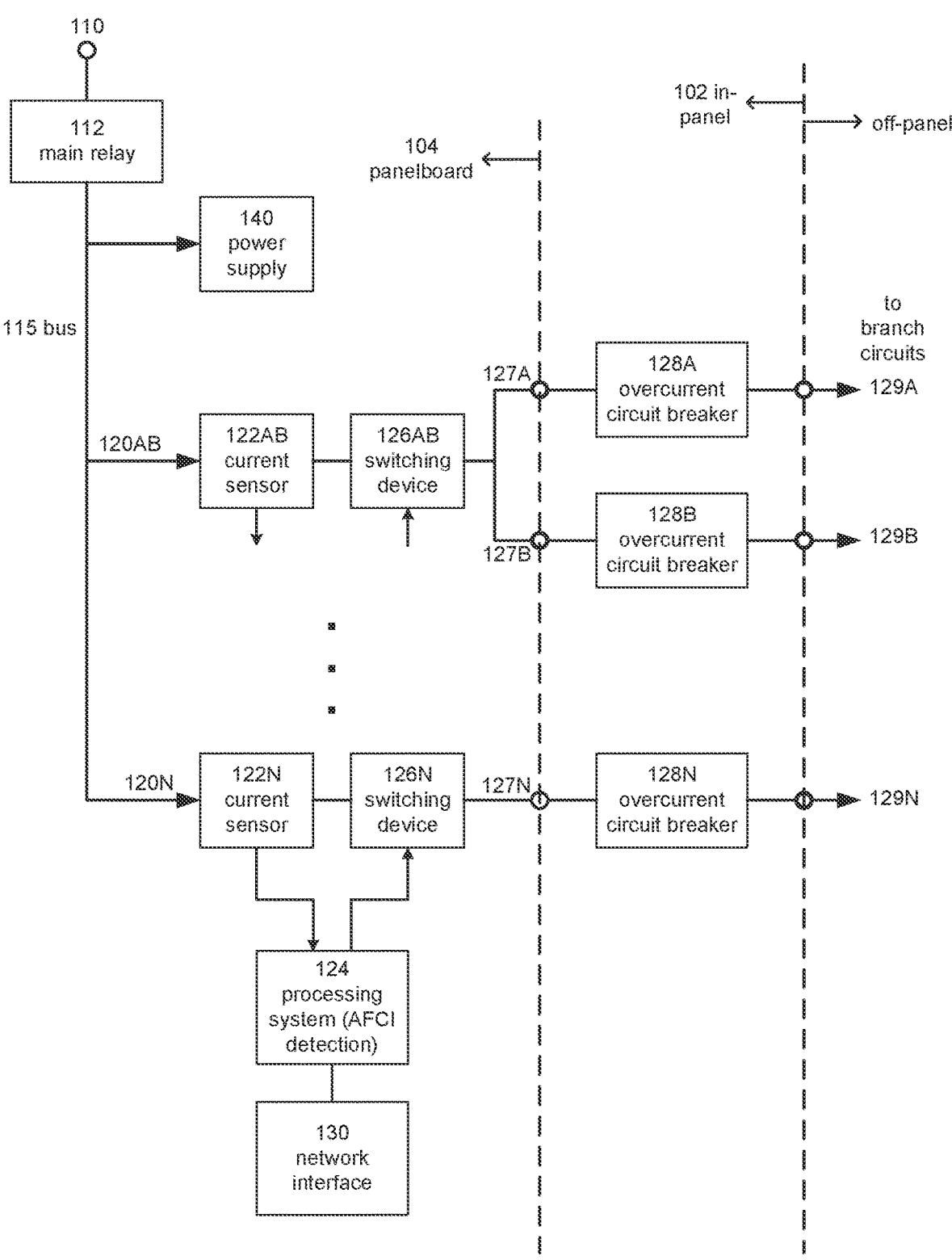
FIG. 7 is a block diagram of an electrical panel with integrated AFCI protection, using sensors and actuators shared among multiple branch circuits.

FIG. 7 shows a variation in which the current sensor 122 and switching devices 126 are shared among different branch circuits 129. FIG. 7 is the same as FIG. 1, except that there is only one branch 120AB from bus structure 115, one current sensor 122AB and one switching device 126AB for the two branch circuits 129A and 129B. In other variations, only the current sensor may be shared, or only the switching device may be shared.

One advantage of the AFCI architectures described herein is that the AFCI protection is more easily configurable. The AFCI protection may be software configurable, both in terms of which branch circuits are protected and also in terms of what detection/protection is applied to each branch. In some cases, AFCI protection may be provided for all branch circuits. If the main relay is also controllable by the processing system, then there may also be redundancy. If an arc fault is detected on a branch circuit but the actuator for that branch circuit is not working, the processing system may interrupt the supply of electricity at the main relay. In some cases, the main relay may serve as the primary actuator, so that the main relay is opened whenever an arc fault is detected on any branch circuit.

The components used for AFCI protection may also be used to provide other functions or additional functions. For example, the panel may send notices whenever an arc fault is detected. Other types of messages, such as diagnostic messages or monitoring messages, may also be transmitted. These messages may be displayed on the panel or may activate indicators on the panel, such as LEDs. They may also be sent off-panel, for example to user devices or apps, or to other panels or other components of the electrical distribution system.

The processing system 124 may be programmed to also detect overcurrent situations. This may be used to augment the physical overcurrent circuit breakers or possibly to replace them. As additional examples, the components shown in FIG. 1 may be used to provide energy metering— monitoring the usage of electricity on different branch circuits. Energy management—controlling the usage of electricity on different branch circuits—may also be implemented. This provides additional functionality by reusing already existing components. The reverse is also true. If these components already exist in order to provide other functions such as energy metering or management, they may be reused to also provide AFCI protection.

Although the detailed description contains many specifics, these should not be construed as limiting the scope of the invention but merely as illustrating different examples. It should be appreciated that the scope of the disclosure includes other embodiments not discussed in detail above. Various other modifications, changes and variations which will be apparent to those skilled in the art may be made in the arrangement, operation and details of the method and apparatus disclosed herein without departing from the spirit and scope as defined in the appended claims. Therefore, the scope of the invention should be determined by the appended claims and their legal equivalents.

What is claimed is:

1. An electrical panelboard comprising:
   a main terminal configured to receive a supply of electricity;
   a plurality of branch circuit terminals configured to supply electricity to branch circuits, wherein the branch circuit terminals are (a) stabs configured for connection to overcurrent circuit breakers for the branch circuits or (b) fuse holders configured for connection to fuses for the branch circuits;
   a bus structure configured to distribute the supply of electricity from the main terminal to the branch circuit terminals;
   current sensors electrically coupled to conductive paths between the bus structure and the branch circuit terminals, wherein the current sensors are configured to sense a flow of electricity through the branch circuits;
   switching devices electrically connected between the bus structure and the branch circuit terminals; wherein the switching devices are configured to interrupt the flow of electricity in the branch circuits; and
   a processing system that analyzes current signals from the current sensors, detects arc fault events based on the analysis, and controls the switching devices to interrupt the flow of electricity to the branch circuits in response to detecting arc fault events.

2. The panelboard of claim 1 wherein a separate current sensor and switching device are used for each branch circuit, the processing system comprises one or more processing devices, and each processing device detects arc fault events for multiple branch circuits.

3. The panelboard of claim 1 further comprising:
   a main switching device configured to interrupt the flow of electricity from the main terminal to the bus structure; wherein if one of the switching devices corresponding to a branch circuit does not interrupt the flow of electricity to the branch circuit in response to control by the processing system, the processing system then controls the main switching device to interrupt the flow of electricity from the main terminal to the bus structure.

4. The panelboard of claim 1 wherein AFCI protection provided by the processing system is software configurable, including turning AFCI protection on and off for different branch circuits.

5. The panelboard of claim 1 wherein the detection of arc fault events is adaptive.

6. The panelboard of claim 5 wherein the detection of arc fault events is adapted based on measurements of the branch circuits that characterize an electrical behavior of the branch circuits.

7. The panelboard of claim 5 wherein the detection of arc fault events is adapted based on cross-talk between branch circuits.

8. The panelboard of claim 5 wherein the detection of arc fault events is adapted based on historical data for the branch circuits.

9. The panelboard of claim 5 wherein the detection of arc fault events is adapted based on what appliances load which branch circuits.

10. The panelboard of claim 5 wherein the detection of arc fault events is adapted to reduce a rate of false positives.

11. The panelboard of claim 1 wherein controlling at least one of the switching devices to interrupt the flow of electricity to one branch circuit depends on the analysis of current signals for other branch circuits.

12. The panelboard of claim 1 wherein, for a detected arc fault event, the processing system determines which branch circuit is a likely location of the arc fault event and controls the corresponding switching device to interrupt the flow of electricity to that branch circuit and does not interrupt the flow of electricity to other branch circuits.

13. The panelboard of claim 1 wherein the processing system stores a record of detected arc fault events, and the record includes metadata characterizing the detected arc fault event.

14. The panelboard of claim 1 wherein the processing system further determines electricity usage based on the analysis of current signals from the current sensors.

15. The panelboard of claim 14 wherein the processing system further controls the switching devices in response to the determined electricity usage.

16. The panelboard of claim 1 wherein the processing system detects arc fault events for every branch circuit supplied by the panelboard.

17. The panelboard of claim 1 wherein:
   the processing system detects arc fault events based on at least one of: a frequency domain analysis of the current signals, and a time domain analysis of the current signals;
   the current sensors comprise at least one of: a current transformer, a Hall effect sensor, a current sensor based on magnetoresistive elements, an inductive pickup coil, a shunt resistor, an impedance in series with current flow, and a fluxgate current sensor; and
   the switching devices comprise at least one of: a semiconductor switch, a relay, a motor-driven switch, a shunt trip circuit breaker, and an electrically triggered spring-driven contact system.

18. A system comprising:
   an electrical panelboard comprising:
      a plurality of branch circuit terminals configured to supply electricity to branch circuits, wherein the branch circuit terminals are (a) stabs configured for connection to overcurrent circuit breakers for the branch circuits or (b) fuse holders configured for connection to fuses for the branch circuits;
      a bus structure that provides a supply of electricity to the branch circuit terminals;
      current sensors that sense a flow of electricity through the branch circuits; and
      switching devices that control the flow of electricity through the branch circuits, wherein the current sensors and switching devices are electrically coupled to conductive paths between the bus structure and the branch circuit terminals; and a processing system that analyzes current signals from the current sensors, detects arc fault events based on the analysis, and controls the switching devices to interrupt the flow of electricity in response to the detection of arc fault events.

19. The system of claim 18 wherein:

the processing system includes an in-panel processing device contained in the electrical panelboard and an off-panel compute resource external to the electrical panelboard; and the electrical panelboard further comprises:

a power supply that receives power from the electricity supplied to the panelboard, and provides power to the switching devices and to the in-panel processing device; and a wireless terminal that provides communication between the in-panel processing device and the off-panel compute resource.

* * * * *